US010319024B2

(12) United States Patent
Bueno Lobl

(10) Patent No.: US 10,319,024 B2
(45) Date of Patent: Jun. 11, 2019

(54) COLLABORATIVE GEOLOCATION SHOPPING

(71) Applicant: PAYPAL, INC., San Jose, CA (US)

(72) Inventor: Lorena Bueno Lobl, Delray Beach, FL (US)

(73) Assignee: PAYPAL, INC., San Jose, CA (US)

( * ) Notice: Subject to any disclaimer, the term of this patent is extended or adjusted under 35 U.S.C. 154(b) by 1178 days.

(21) Appl. No.: 14/531,461

(22) Filed: Nov. 3, 2014

(65) Prior Publication Data

US 2016/0125507 A1   May 5, 2016

(51) Int. Cl.
*G06Q 30/06* (2012.01)

(52) U.S. Cl.
CPC ..... *G06Q 30/0633* (2013.01); *G06Q 30/0613* (2013.01); *G06Q 30/0639* (2013.01)

(58) Field of Classification Search
CPC ........... G06Q 30/0633; G06Q 30/0613; G06Q 30/0639
See application file for complete search history.

(56) References Cited

U.S. PATENT DOCUMENTS

| | | | | |
|---|---|---|---|---|
| 7,908,175 | B2 * | 3/2011 | Chang | G06Q 30/02 705/26.8 |
| 8,589,212 | B2 * | 11/2013 | Pollak | G06Q 30/08 705/7.35 |
| 2005/0267810 | A1 * | 12/2005 | Zheng | G06Q 30/0257 705/14.55 |
| 2011/0093344 | A1 * | 4/2011 | Burke | G06Q 20/20 705/14.65 |
| 2015/0287084 | A1 * | 10/2015 | Gura | G06Q 30/0261 705/14.58 |
| 2015/0317708 | A1 * | 11/2015 | Eramian | G06Q 30/06 705/26.8 |

OTHER PUBLICATIONS

C. Constantinov, A. Mocanu and E. Popescu, "Online auctioning and recommendations: The eBidLand platform," 2012 16th International Conference on System Theory, Control and Computing (ICSTCC), Sinaia, 2012, pp. 1-6. URL: http://ieeexplore.ieee.org/stamp/stamp.jsp?tp=&arnumber=6379250&isnumber=6379186.*
C. Constantinov, A. Mocanu and E. Popescu, "Online auctioning and recommendations: The eBidLand platform," 2012 16th International Conference on System Theory, Control and Computing (ICSTCC), Sinaia, 2012, pp. 1-6. URL: http://ieeexplore.ieee.org/stamp/stamp.jsp?tp=&arnumber=6379250&isnumber=6379186 (2012).*

* cited by examiner

*Primary Examiner* — Kathleen Palavecino
*Assistant Examiner* — Lance Y Cai
(74) *Attorney, Agent, or Firm* — Haynes and Boone LLP

(57) ABSTRACT

Methods and systems for facilitating collaborative shopping are described. A user creates and shares a shopping list containing desired items. The shopping list includes quantities of the items and deadlines for purchasing the items. When the user or one of his or her friends are at or near a location selling a desired item, they are alerted to purchase the item. As items are purchased by the user and his or her friends, the shopping list may be updated, and notes may be posted to the shopping list. Such updates and notes may include information regarding visited locations, prices of items, availability of items, restock or delivery dates, dates that locations were visited, etc.

18 Claims, 4 Drawing Sheets

COLLABORATIVE GEOLOCATION SHOPPING

BACKGROUND

Field of the Invention

The present invention generally relates to in-store purchasing, and more particularly to facilitating collaborative shopping at one or more stores.

Related Art

Technology has allowed individuals to engage in a variety of collaborative activities. One area where collaboration is still needed, however, is in the area of shopping transactions. Typical shopping transactions, such as grocery shopping, are associated with a single individual, rather than a group. For online transactions, a single user generally has a single shopping cart associated with that user. Traditional shopping experiences prevent people in a same household or in other mutual beneficial relationships from collaboratively shopping with one another.

Thus, there exists a need to improve the process of collaborative shopping.

Figure 1:
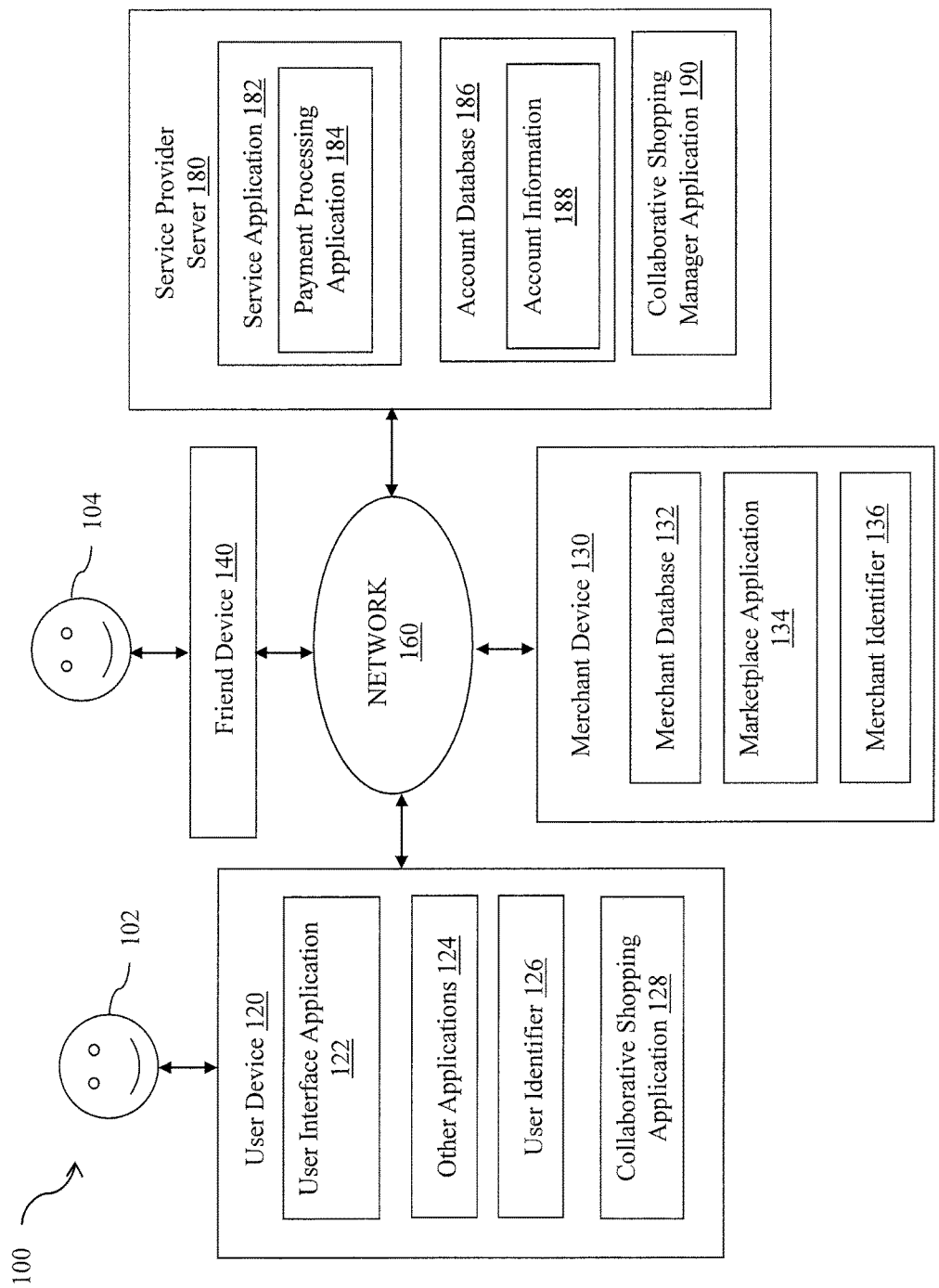
FIG. 1 is a block diagram illustrating a system for facilitating collaborative shopping according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that facilitate collaborative shopping. The systems and methods allow multiple participants to collaborate on the purchase of items from a shopping list, update the shopping list, predict numbers of items needed on the shopping list, and post notes to the shopping list. A user can thus effectively manage the shopping list.

A user is able to share a shopping list with his or her friends. The shopping list can include various details such as items to purchase, places to purchase the items, prices for items, number of items to purchase, and deadlines for acquiring the items. In various embodiments, when a user or a friend is at or near a specified place, he or she is alerted to the items on the shopping list. As items are purchased, the shopping list can be updated and notes posted as to status of certain items. The shared shopping list can then be viewed by the user and his or her friends. The user can also post notes as to when stores are expected to receive inventory so that the user and/or friend can be alerted on the date. Instead of having to individually purchase every item on the list, the user is able to distribute the task of purchasing to a group, which saves both time and energy.

In exemplary embodiments, the shopping list includes predictions of what items and how many items will be needed at a future time or future periods of time. The predictions can be based, for example, on past shopping lists, previous sale history of an item, and current and/or predicted demand for an item. If a user or a friend comes across an item that can be pre-ordered and/or is available at the future time for a lower price (e.g., rainchecked items), the item can be pre-ordered and picked up at a later time. In some embodiments, the user or friend can indicate when a raincheck or pre-order can be used and/or for how long the raincheck or pre-order is valid.

FIG. 1 shows one embodiment of a block diagram of a network-based system 100 adapted to facilitate collaborative shopping with a user device 120 and friend device 140 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), one or more merchant servers or devices 130 (e.g., network server devices), a friend device 140 (e.g., a smartphone), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the merchant device 130 and/or the service provider server 180 over the network 160. For example, the user 102 may conduct financial transactions (e.g., account transfers) with the service provider server 180 via the user device 120. The user device 120, in various embodiments, may be implemented using any appropriate combination of hardware and/or software configured for wired and/or wireless communication over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120, in one embodiment, includes a user interface application 122, which may be utilized by the user 102 to conduct transactions (e.g., shopping, purchasing, bidding, etc.) with the merchant device 130 and/or service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The user device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the user device 120 (e.g., cell phone). The user profile may be updated with each financial and/or information transaction (e.g., payment transaction, purchase transaction, etc.) achieved through use of the user device 120. In various aspects, this may include the type of transaction and/or the location information from the user device 120. As such, the profile may be used for recognizing patterns of potential fraud, setting transaction limits on the user, etc.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The user device 102, in one embodiment, includes a geo-location component adapted to monitor and provide an instant geographical location (i.e., geo-location) of the user device 120. In one implementation, the geo-location of the user device 120 may include global positioning system (GPS) coordinates, zip-code information, area-code information, street address information, and/or various other generally known types of geo-location information. In one example, the geo-location information may be directly entered into the user device 120 by the user 102 via a user input component, such as a keyboard, touch display, and/or voice recognition microphone. In another example, the geo-location information may be automatically obtained and/or provided by the user device 120 via an internal or external GPS monitoring component. In one aspect, when interfacing with the user device 120, the user 102 may elect to provide or may be prompted to provide permission for the release of geo-location information. Accordingly, the user 102 may have exclusive authority to allow transmission of geo-location information from the user device 120 to the one or more merchant devices 130 and/or the service provider server 180. In any instance, the one or more merchant devices 130 and/or the service provider server 180 may communicate with the user device 120 via the network 160 and request permission to acquire geo-location information from the user device 120 for geo-location based mobile commerce.

In certain embodiments, the user device 120 includes a collaborative shopping application 128. Collaborative shopping application 128 may correspond to one or more processes to execute modules of user device 120 to receive, update, predict, and transmit shopping list information to user 102 and/or friend 104. In this regard, collaborative shopping application 128 may be utilized to, for example, provide a convenient interface to permit user 102 to browse information available over the network 160 and utilize services available from service providers, such as service provider server 180. In one embodiment, a service provider distributes the collaborative shopping application 128 to the user device 120 over the network 160. In some embodiments, the collaborative shopping application 128 receives shopping list information from the user 102 and stores the shopping list locally on the user device 120. In other embodiments, the collaborative shopping application 128 creates a shopping list for the user 102, and user 102 can accept or change the items, quantities of items, deadlines for items, maximum prices of items, etc. on the shopping list.

Friend device 140 may be configured similarly to user device 120, and have similar applications and modules as user device 120. Although not shown, friend device 140 may also include one or more user interface applications 122 and collaborative shopping application 128 to provide a convenient interface to permit friend 104 to browse information (e.g., a shopping list) and perform tasks over network 160. For example, in one embodiment, collaborative shopping application 128 may be implemented as a web browser configured to view information available over the network 160 and communicate with service provider server 180 to receive, send, and update information about items on the shopping list.

Friend device 140 may further include other applications 124 such as security applications for implementing client-side security features, programmatic client applications for interfacing with appropriate application programming interfaces (APIs) over network 160, or other types of applications. Applications 124 may also include email, text, IM, and voice applications that allow friend 104 to communicate through network 160, receive messages from user 102, and send messages to user 102. Friend device 140 includes one or more user identifiers 126 which may be implemented, for example, as operating system registry entries, cookies associated with user interface application 122, identifiers associated with hardware of friend device 140 such as location address or GPS coordinates, or other appropriate identifiers, such as used for payment/recipient/device authentication, e.g., the phone number associated with friend device 140. Identifiers may be used by a service provider to associate friend 104 with a particular account maintained by the service provider and/or user 102.

Figure 2:
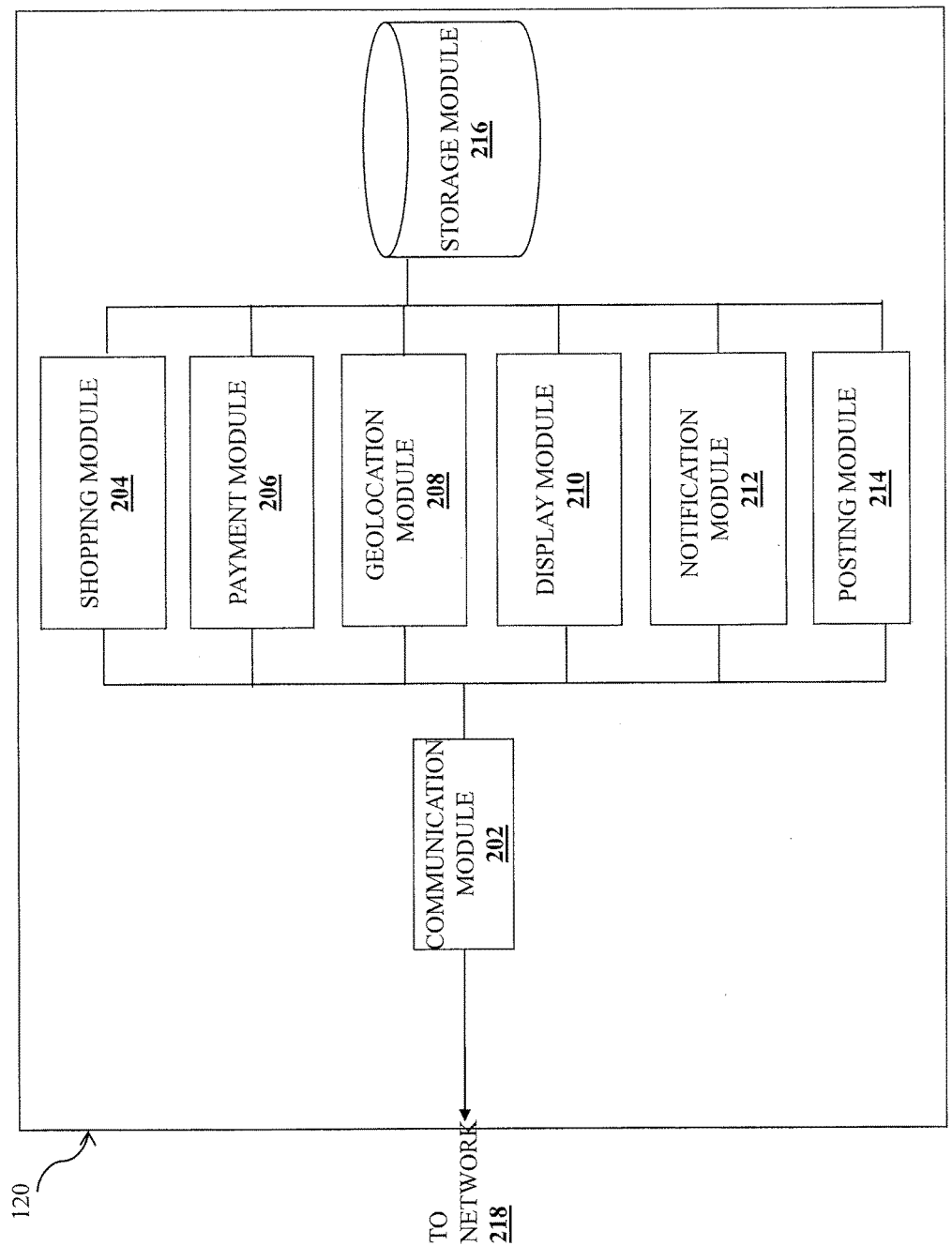
FIG. 2 is a block diagram illustrating a user device and/or friend device according to an embodiment of the present disclosure.

FIG. 2 illustrates an embodiment of a user device 120 and friend device 140. The devices 120 and 140 include several components or modules, such as a communication module 202, shopping module 204, payment module 206, geolocation module 208, display module 210, notification module 212, posting module 214, and storage module 216.

The devices 120 and 140 include a communication module 202 that is coupled to the network 218 and to any or all of a shopping module 204, payment module 206, geolocation module 208, display module 210, notification module 212, and posting module 214, any of which may be coupled to a storage module 216. Any or all of the modules 202-214 may be implemented as a subsystem of the user device 120 and/or friend device 140 including for example, a circuit, a hardware component, a hardware subcomponent, and/or a variety of other subsystems known in the art. Furthermore, any or all of the modules 202-214 may be preconfigured to perform their disclosed functionality, or may be configured by a processing system "on-the-fly" or as needed to perform their disclosed functionality. As such, any or all of the modules 202-214 may include pre-configured and dedicated circuits and/or hardware components of the user device 120 and/or friend device 140, or may be circuits and/or hardware components that are configured as needed.

For example, any or all of the modules 202-214 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that causes the modules 202-214 to perform the functions described below. As such, in some embodiments, preconfigured and dedicated circuits may be implemented to perform the functions of the modules 202-214. In other embodiments, a processing system may execute instructions on a non-transitory, computer-readable medium to configure one or more circuits as needed to perform the functions of the modules 202-214.

The communication module 202 may be included as a separate module provided in the device 120 and/or 140, or may be provided using instructions stored on a computer-readable medium that, when executed by a processing system in the device 120 and/or 140, configure the communication module 202 to send and receive information over the network 218, as well as provide any of the other functionality that is discussed herein. The shopping module 204 may be included as a separate module provided in the device 120 and/or 140, or may be provided using instructions stored on a computer-readable medium that, when executed by a processing system in the device 120 and/or 140, configure the shopping module 204 to receive shopping list information from the user 102, update the shopping list, predict what items and amounts of items will be needed in the future, and post notes to the shopping list, as well as provide any of the other functionality that is discussed herein. In some embodiments, the shopping module 204 notes whether an item on the shopping list is a pre-ordered item or a rainchecked item. The shopping module 204, in various embodiments, indicates how long a raincheck or pre-order is valid or may be used for. For example, the shopping module 204 can provide a date when a rainchecked or pre-ordered item is available for pickup and a date when the rainchecked or pre-ordered item is no longer available. In certain embodiments, the shopping module 204 analyzes purchase history of the user 102, previous sales of an item, expected surges (both high and low) of an item, and predicts what the user 102 may need in the future. These predictions help the user 102 plan his or her purchases, can be incorporated in the shopping list, and shared with friends. The payment module 206 may be included as a separate module provided in the device 120 and/or 140, or may be provided using instructions stored on a computer-readable medium that, when executed by a processing system in the device 120 and/or 140, configure the payment module 206 to receive payment requests from the user 102 and/or friend 140 and process the payment requests, as well as provide any of the other functionality that is discussed herein. The geolocation module 208 may be included as a separate module provided in the device 120 and/or 140, or may be provided using instructions stored on a computer-readable medium that, when executed by a processing system in the device 120 and/or 140, configure the geolocation module 208 to read geo-tags associated with items in the shopping list and detect or determine the location of the user 102 and/or friend 104. The display module 210 may be included as a separate module provided in the device 120 and/or 140, or may be provided using instructions stored on a computer-readable medium that, when executed by a processing system in the device 120 and/or 140, configure the display module 210 to present the shopping list to user 102 and/or friend 104, along with any updates or notes. The notification module 212 may be included as a separate module provided in the device 120 and/or 140, or may be provided using instructions stored on a computer-readable medium that, when executed by a processing system in the device 120 and/or 140, configure the notification module 212 to notify or remind the user 102 and/or friend 104 regarding items on the shopping list, such as dates when items (e.g., pre-ordered or rainchecked items) are expected to be delivered or available at a certain location. The notification module 212 can monitor or otherwise keep track of dates when items are expected to be available. For example, the notification module 212 can alert the user 102 and/or friend 104 if one of them is close to a location that sells one or more items on the shopping list and if a store is being restocked with items. The posting module 214 may be included as a separate module provided in the device 120 and/or 140, or may be provided using instructions stored on a computer-readable medium that, when executed by a processing system in the device 120 and/or 140, configure the posting module 214 to post or publish a purchased item on an online store. Furthermore, other modules discussed above but not illustrated in FIG. 2 may be provided as separate modules on the device 120 and/or 140, or using instructions stored on a computer-readable medium similarly as discussed above. While the storage module 212 has been illustrated as located in the device 120 and/or 140, one of ordinary skill in the art will recognize that it may include multiple storage modules and may be connected to the modules 204-214 through the network 218 without departing from the scope of the present disclosure.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 and/or friend 104 over the network 160. As such, each of the one or more merchant servers 130 may include a merchant database 132 for identifying available items, which may be made available to the user device 120 and/or friend device 140 for viewing and purchase by the user 102 and/or friend 104. In one or more embodiments, user 102 and/or friend 104 may complete a transaction such as purchasing the items via service provider server 180.

Each of the merchant servers 130, in one embodiment, may include a marketplace application 134, which may be configured to provide information over the network 160 to the user interface application 122 of the user device 120 and/or friend device 140. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants In one implementation, the merchant identifier 136 may include one or more attributes and/or parameters related to the merchant, such as business and banking information. The merchant identifier 136 may include attributes related to the merchant server or device 130, such as identification information (e.g., a serial number, a location address, GPS coordinates, a network identification number, etc.). In various embodiments, user 102 and/or friend 104 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to a merchant website, such as payment intermediary between customers of the merchant website and the merchant website itself. For example, the merchant website may use an application programming interface (API) that allows it to offer sale of goods in which customers are allowed to make payment through the service provider, while user 102 and/or friend 104 may have an account with the service provider that allows user 102 and/or friend 104 to use the service provider for making payments to merchants that allow use of authentication, authorization, and payment services of the service provider as a payment intermediary. The merchant website may also have an account with the service provider.

The service provider server 180, in one embodiment, may be maintained by a transaction processing entity or an online service provider, which may provide processing for financial transactions and/or information transactions between the user 102 and/or friend 104 and one or more of the merchant servers 130. As such, the service provider server 180 includes a service application 182, which may be adapted to interact with the user device 120 and/or friend device 140 over the network 160 to facilitate the searching, selection, purchase, and/or payment of items by the user 102 and/or friend 104 from the one or more merchant servers 130. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and/or friend 104 and each of the merchant servers 130. In one implementation, the payment processing application 184 assists with resolving financial transactions through validation, delivery, and settlement. As such, the service application 182 in conjunction with the payment processing module 184 settles indebtedness between the user 102 and/or friend 104 and each of the merchant servers 130, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., user 102 and friend 104) and merchants. For example, account information 188 may include private financial information of user 102, friend 104, and merchants (e.g., one or more merchants associated with merchant servers 130), such as one or more account numbers, passwords, credit card information, banking information, or other types of financial information, which may be used to facilitate financial transactions between user 102 and/or friend 104, and one or more merchants associated with the merchant servers 130. In various aspects, the methods and systems described herein may be modified to accommodate users and/or merchants that may or may not be associated with at least one existing user account and/or merchant account, respectively.

In one implementation, the user 102 and/or friend 104 may have identity attributes stored with the service provider server 180, and user 102 and/or friend 104 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 and/or friend 104 with one or more particular user accounts maintained by the service provider server 180.

In various embodiments, the service provider server 180 includes a collaborative shopping manager application 190. The collaborative shopping manager application 190 is configured to register the user 102 and friend 104 with a shopping collaboration service and is configured to receive shopping list information for a shopping transaction of the user 102. The collaborative shopping manager application 190 is also configured to assign one or more friends to the shopping transaction and record, receive, and communicate information related to the shopping transaction between the user 102 and the one or more friends 104.

Figure 3:
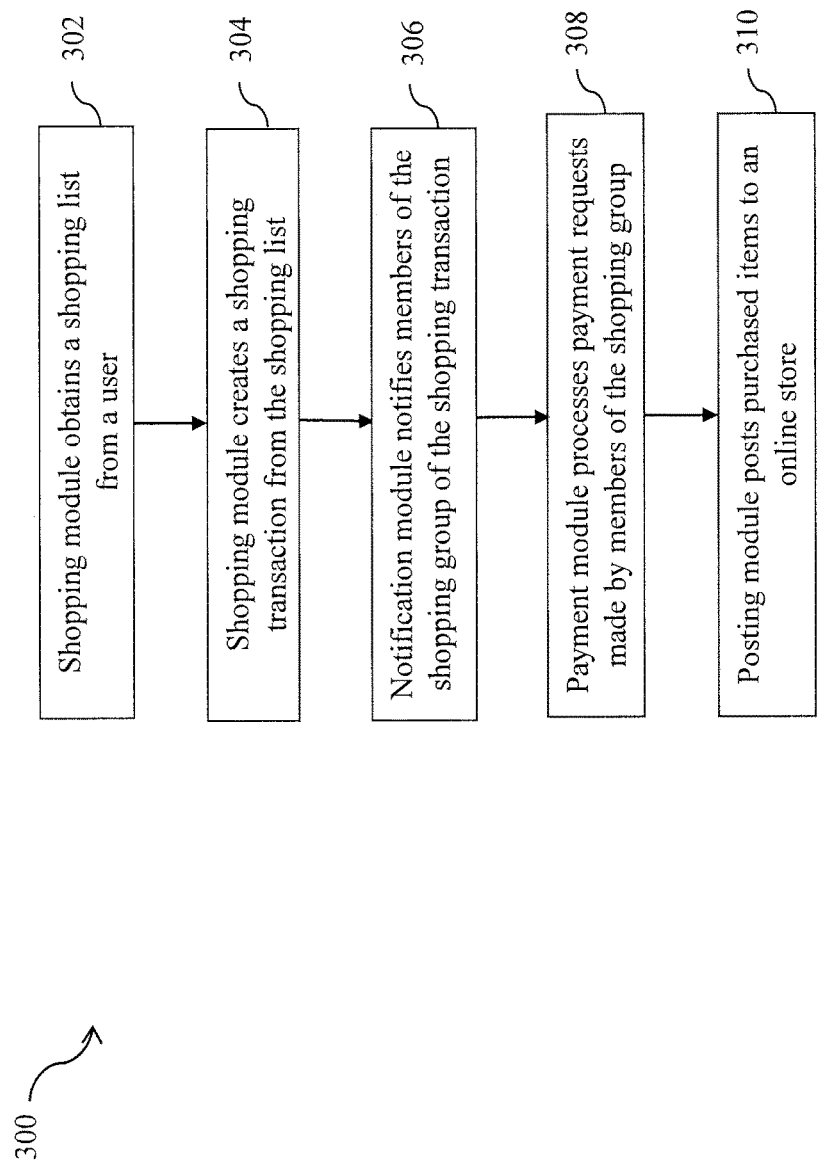
FIG. 3 is a flowchart showing a method for facilitating collaborative shopping according to an embodiment of the present disclosure.

Referring now to FIG. 3, a flowchart 300 of a method for facilitating collaborative shopping is illustrated according to an embodiment of the present disclosure. In various embodiments, the user 102 registers with a service provider for a collaborative shopping service. Registration may include signing up for the service and agreeing to any terms required by the service provider, such as through user device 120. In one embodiment, the user device 120 is a mobile computing device, such as a smart phone, a PC, or a computing tablet. In some embodiments, registration may be done completely through the user device 120, partially through the user device 120, or without using the user device 120, such as through a phone call or in-person visit to a representative of the service provider.

The user 102 may be requested to provide specific information for registration, such as, but not limited to, a name, address, phone number, email address, picture, a user name for the account, and a password or PIN for the account. In various embodiments, the user 102 also provides a list of family, friends, and/or social contacts that the user 102 wants to be notified about his or her shopping list. These family, friends, and/or social contacts can then be invited by the service provider to sign up for the collaborative shopping service. Alternatively, they can independently sign up for the service, and the user 102 can designate who he or she wants to be a shopper in his or her collaborative shopping group. As used herein, "member," "member of the group," "member of the shopping group," or "member of the collaborative shopping group" is meant to designate both the user 102 and the shoppers designated by the user 102 (e.g., the user's family, friends, and/or social contacts).

The type of information requested may depend on whether the user 102 already has an account with the service provider. Requested information may be entered through the user device 120 or other means, including voice or manual key entry. Once all the requested information is received and confirmed, the service provider may create an account for the user.

Buying and selling merchandise and services via the Internet has become more widely accepted and more secure in recent years. Aside from established merchants and commercial retailers, individuals have found a marketplace online for shopping or peddling their new or used merchandise, as well as seeking or offering a variety of services. In various embodiments, user 102 is an individual who is an online seller of merchandise. In certain embodiments, user 102 is a "power seller," or a seller that consistently sells a significant volume of items, provides a high level of service to their buyers, and maintains a positive feedback score.

At step 302, the shopping module 204 receives or obtains a shopping list from the user 102. The shopping list can be obtained via selections from lists presented to the user 102, via free text entry by the user 102, via searching of repositories presented to the user 102, and/or via questions asked in automated fashion to the user 102.

In certain embodiments, the shopping list includes one or more of a budget, a specific maximum price, a geographic region for the shopping transaction, a specific brand for an item, a specific company/store providing the item, and/or a specific attribute for the item. In some embodiments, the user 102 specifies the desired items, locations to buy the items (e.g., specific stores or specific store locations), maximum prices of the items, and deadlines for purchasing the items.

In some embodiments, the shopping module 204 creates the shopping list for the user 102. The shopping module 204 can access the storage module 216, which can store user 102's prior selling or buying habits, to determine what the user 102 may need and in what quantities. The user 102 can then view the shopping list and confirm or change the items, quantities, and other details in the shopping list. For example, if the user 102 previously bought or sold 100 bead bracelets in December, the shopping module 204 can include 100 bead bracelets in the shopping list and indicate the deadline for purchasing the bracelets as late November or early December. Moreover, the shopping module 204 can examine what the user 102 is selling and/or how fast or slow items are being sold, both by the user and by others. Amounts and deadlines in the shopping list can then be adjusted so that the user 102 can keep up with demand and not have to store a lot of inventory or be under stocked. Price changes may also be predicted, such as for items where demand may be high (or low) over a certain period of time and what price may generate the most sales and/or most profit, which can depend on the user's goals or preferences.

The user 102 can also indicate whether items can be pre-ordered, the quantities and maximum prices of pre-ordered items, dates when pre-ordered items need to be available at the store, and/or dates when pre-ordered items will no longer be available at the store. The user 102 can thus include a timeframe that indicates when the pre-order can begin to be redeemed and a deadline that indicates when the pre-order is no longer available. The shopping list can indicate all these details. Based on this information, members of the collaborative shopping group can be notified when they are near an item that can be pre-ordered and order the item before it is actually needed. For example, if a member visits a merchant store and discovers that an item is not available, but will be available in the future, the member can pre-order the item and come back for it at a later date.

In an exemplary embodiment, if a member of the shopping group brings an advertisement that shows a product as "on sale" for a specific reduced sale price at a retail store, and the member goes to that store and attempts to purchase the "on sale" item only to find that the particular item is sold out (i.e., not on the shelf or in inventory), the member may obtain a raincheck from the store. The raincheck allows the member to purchase that same item in the future at the currently advertised sale price. The raincheck typically identifies the "on sale" item, the sale price and date, thereby allowing the member to return to the store in the future and purchase the "on sale" item at the sale price. The raincheck may also provide information such as the SKU number and/or UPC code for the particular item. When the rainchecked item is available, the store generally lets the member know. When the user 102 finds out about a rainchecked item, the user 102 can update the shopping list to inform other members of the group and let them know when the rainchecked item is available and/or how long the rainchecked item will be available. For example, the user 102 can provide an expiration date for the raincheck so that members know how long the raincheck is valid.

In some embodiments, the user 102 notes that one or more items are associated with a raincheck and provides the other members of the group access to the raincheck so that they can pick up an item when it becomes available. In various embodiments, the raincheck may be used only at a certain store location. Thus, the user 102 is able to manage his or her inventory of items based on the quantities of items, current or anticipated needs of customers, current inventory, availability of items, and price of items.

In several exemplary embodiments, the items on the shopping list are geo-tagged. For example, the user 102 can geo-tag all locations of Store W for X item at Y price until Z Date. The geo-tag allows the user 102 to associate a geographical location with an item on the shopping list. In certain embodiments, the geolocation module 208 can check for any matches between the geo-tagged items on the list and the location of a member of the shopping group. The geolocation module 208 then determines possible matches and then communicates these matches to the notification module 212 to alert a member to any matches. Thus, when user 102 or any member of his or her collaborative shopping group are near a location or within a predetermined distance of a location associated with an item on the shopping list, he or she can be notified to purchase the item.

As used herein, "geo-tag" and "geo-tagging" refers to the adding of geographical metadata, or other geographical identifier(s) identifying a geographical location, to various types of media such as, without limitation, audio, text files, pictures, video, SMS messages, MMS messages, RSS feeds, and the like. As used herein, geo-tag and geo-tagging may also refer to the storing of a file, or an identifier that identifies a file, in association with one or more geographical identifiers (e.g., in a database). In one example, a geo-tag or geographical metadata or geographical identifier(s) for a particular file may include a latitude coordinate and a longitude coordinate. In another example, a geo-tag may include, alternatively or in addition, one or more of an altitude, bearing, distance, accuracy data and/or place name(s) (e.g., Times Square; Eiffel Tower).

In some embodiments, the items on the shopping list are not geo-tagged. For example, the user 102 may provide a list of desired items, maximum prices of the desired items, quantities of the desired items, and deadlines for purchasing the desired items, without specifying a location to buy the items. The geolocation module 208 can take the shopping list and determine what stores provide the desired items at the prices, quantities, and deadlines specified by the user 102. For example, the geolocation module 208 can access a store's website and/or receive information from the store to determine if the store has what the user 102 is looking for. In these embodiments, when the user 102 or friend 104 is at or near a store selling an item on the shopping list, the notification module 212 can alert the user 102 or friend 104 to purchase the item.

At step 304, the shopping module 204 creates a shopping transaction using the shopping list. The shopping transaction identifies the shopping list and the members assigned to the shopping list. In an embodiment, the shopping transaction is a series of subtransactions that are conducted by the user 102 and other members of the shopping group over a period of time. The period of time may be bounded. In other cases, the subtransactions can occur until a specific event occurs (e.g., everything on the list is purchased). The display module 210 presents the shopping list to individual members of the shopping group.

At step 306, the notification module 212 notifies members of the shopping group of the shopping transaction. For example, the collaborative shopping manager application 190 sends a communication (e.g., email, instant message, etc.) to each member of the group informing them that the user 102 has listed them as designated shoppers and providing each of them with the shopping list.

In some embodiments, members of the group can be alerted that they are near a store that sells an item (e.g., geo-tagged item). Members are notified by the notification module 212 when a nearby business has in its inventory an item from the shopping list when a member is close enough to act on that information. For example, the geolocation module 208 can determine a location of a member and the notification module 212 can send an alert to a specific member based on the physical location of the member. So when a member is determined as being in a specific store or near a specific store, an alert or notification can be sent to the member. The member can then purchase the item and update the shopping list.

At step 308, the payment module 206 processes payments requests made by members of the shopping group as they purchase the items on the shopping list. As members of the group visit different store locations and purchase different items off the list, the list can be updated to reflect any changes. For example, items from the list can be crossed off once purchased. In addition, members of the group can post notes to the list, indicating that certain store locations do not have an item as of a certain date, that they cleaned out all the stock at a certain store as of a certain date, or that a new shipment of an item is expected on a certain date. The notes and updates are displayed by the display module 210 on a centralized list that is viewable by all members in the group. In this way, shopping for items on the list is made efficient and hassle-free. Members of the group know which locations have already been visited and which have not so that efforts are not duplicated and time is not wasted.

Based on information provided by members of the group, the user 102 can set reminders or alerts to periodically check specific stores, such as times when a store is typically restocked. For example, for stores that restock on a specific schedule, reminders can be sent out by the notification module 212 to check certain store location for refilled stock. In addition, item history, such as where a member was able to acquire items, quantity, price, and inventory can help the user 102 to manage the shopping list.

At step 310, once items are bought, the posting module 214 can immediately post the items to an online store, such as eBay or Craigslist, and made available for purchase.

In various embodiments, data obtained and aggregated by the collaborative shopping manager application 190 is made available to merchants. The data may include information regarding popular merchant items, competitor prices, and popular merchant locations. The merchant can use this data to track competitor items and prices, and modify their own inventory and prices.

Figure 4:
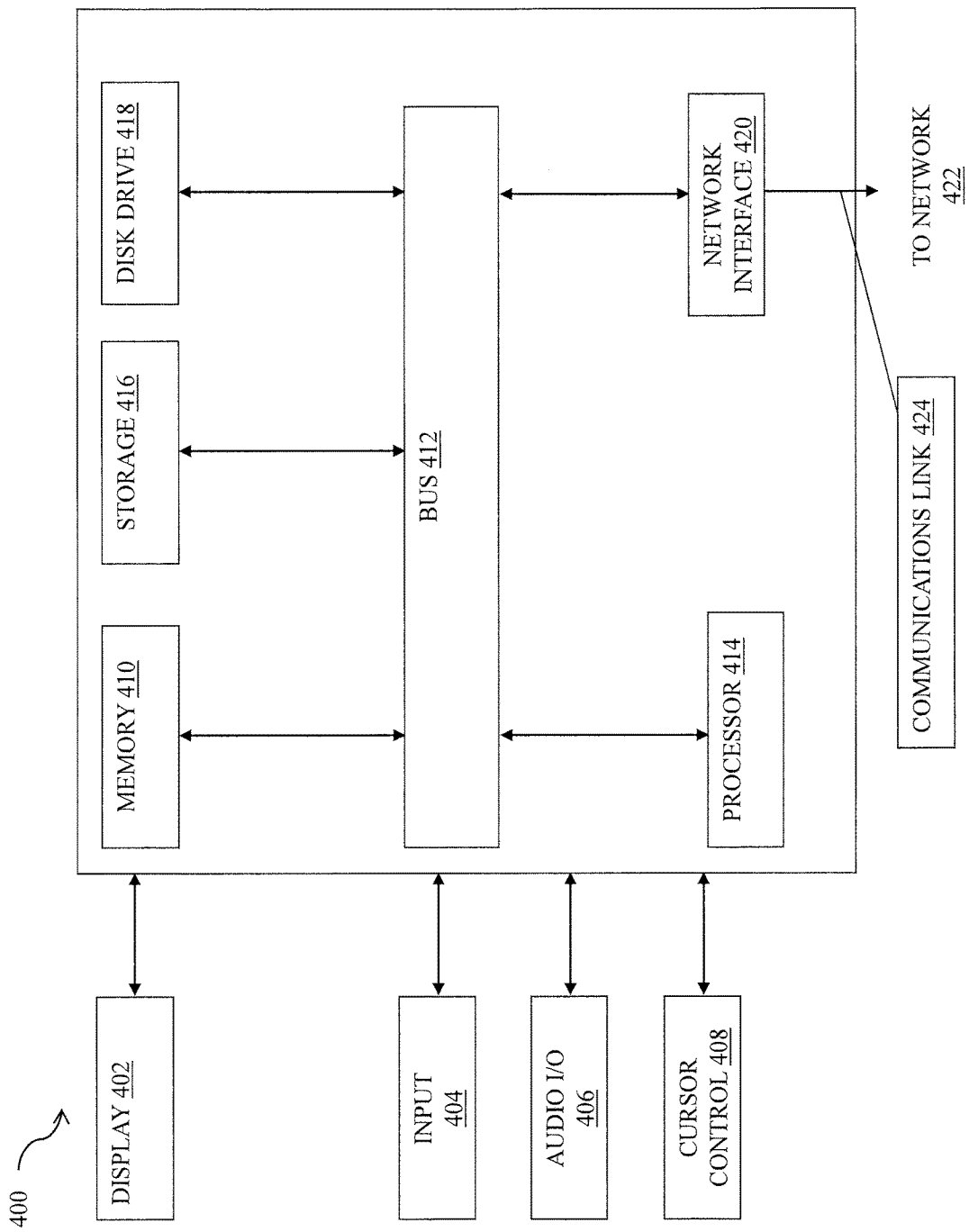
FIG. 4 is a block diagram of a system for implementing a device according to an embodiment of the present disclosure.

FIG. 4 is a block diagram of a computer system 400 suitable for implementing one or more embodiments of the present disclosure, including the user device 120, merchant server 130, and the service provider server 180. In various implementations, the user device 120 may comprise a mobile cellular phone, personal computer (PC), laptop, wearable computing device, etc. adapted for wireless communication, and the merchant server 130 and service provider server 180 may comprise a network computing device, such as a server. Thus, it should be appreciated that the devices 120, 130, and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. For example, processor 414 can receive payment requests, detect that a user profile is stored on a user device, receive authentication information from a user, and automatically present a user with an option to make a payment using one or more funding sources. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled to the non-transitory memory and configured to read instructions from the non-transitory memory to cause the system to perform operations comprising:
   accessing a web server associated with a website of a user to obtain transaction information of a first item offered for sale at the website;
   determining a rate of the first item being sold at the website over a period of time based on the obtained transaction information;
   predicting, based on the rate of the first item being sold at the website over the period of time, a purchase recommendation for a second item corresponding to the first item, wherein the purchase recommendation comprises a quantity of the second item and a deadline for purchasing the second item in the quantity;
   creating a shopping list for the user based on the purchase recommendation, wherein the shopping list includes the second item, the quantity, and the deadline;
   accessing one or more merchant servers to determine one or more merchant locations that offer the second item for sale;
   tagging the second item in the shopping list with the geographical locations corresponding to the one or more merchant locations that offer the second item for sale;
   identifying members of a collaborative shopping group designated by the user;
   determining that a particular member of the collaborative shopping group is available to purchase the second item from at least one of the one or more merchant locations based on location data obtained from geo-location components of user devices associated with the members of the collaborative shopping group and the geographical locations tagged with the second item in the shopping list;

transmitting an alert to a first user device associated with the particular member of the collaborative shopping group, wherein the transmitted alert notifying the particular member to purchase the second item from the at least one of the one or more merchant locations;

receiving a payment request from the particular member for a purchase of the second item from the at least one of the one or more merchant locations; and processing a payment based on the payment request.

2. The system of claim 1, wherein the shopping list further comprises a third item, a maximum price of the third item, and a deadline for purchasing the third item.

3. The system of claim 1, wherein the operations further comprise receiving an update from at least one member of the collaborative shopping group regarding a status of the second item.

4. The system of claim 3, wherein the operations further comprise in response to receiving the update, posting the update to the shopping list.

5. The system of claim 3, wherein the operations further comprise presenting, on a display of a device associated with the user, the shopping list including the update contributed by the at least one member of the collaborative shopping group.

6. The system of claim 3, wherein the update comprises at least one of information regarding a quantity of the second item that are available at a merchant location, a price of the second item at the merchant locations, a date that the merchant location was visited by the at least one member of the collaborative shopping group, or an expected delivery date of the second item at the merchant location.

7. The system of claim 1, wherein the operations further comprise determining a date when the second item is expected to be available at a store location.

8. The system of claim 7, wherein the operations further comprise transmitting alerts to the user devices associated with the members of the collaborative shopping group notifying the members to check for the second item at the store location based on the determined date.

9. The system of claim 1, wherein the user comprises an online seller of merchandise.

10. A method, comprising:
accessing, by one or more hardware processors, a web server associated with a website of a user to obtain transaction information of a first item offered for sale at the website;

determining, by the one or more hardware processors, a rate of the first item being sold at the website over a period of time based on the obtained transaction information;

predicting, by the one or more hardware processors based on the rate of the first item being sold at the website over the period of time, a purchase recommendation for a second item corresponding to the first item, wherein the purchase recommendation comprises a quantity of the second item and a deadline for purchasing the second item in the quantity;

creating, by the one or more hardware processors, a shopping list for the user based on the purchase recommendation, wherein the shopping list includes the second item, the quantity, and the deadline;

accessing, by the one or more hardware processors, one or more merchant servers to determine one or more merchant locations that offer the second item for sale;

tagging, by the one or more hardware processors, the second item in the shopping list with the geographical locations corresponding to the one or more merchant locations that offer the second item for sale;

identifying, by the one or more hardware processors, members of a collaborative shopping group designated by the user;

determining, by the one or more hardware processors, that a particular member of the collaborative shopping group is available to purchase the second item from at least one of the one or more merchant locations based on location data obtained from geo-location components of user devices associated with the members of the collaborative shopping group and the geographical locations tagged with the second item in the shopping list;

transmitting, by the one or more hardware processors, an alert to a first user device associated with the particular member of the collaborative shopping group, wherein the transmitted alert notifying the particular member to purchase the second item from the at least one of the one or more merchant locations;

receiving, by the one or more hardware processors, a payment request from the particular member for a purchase of the second item from the at least one of the one or more merchant locations; and processing, by the one or more hardware processors, a payment based on the payment request.

11. The method of claim 10, further comprising receiving an update from at least one member of the collaborative shopping group regarding a status of the second item.

12. The method of claim 11, further comprising in response to receiving the update, posting the update to the shopping list.

13. The method of claim 10, wherein the user comprises an online seller of merchandise.

14. A non-transitory machine readable medium having stored thereon machine-readable instructions executable to cause a machine to perform operations comprising:
accessing a web server associated with a website of a user to obtain transaction information of a first item offered for sale at the website;

determining a rate of the first item being sold at the website over a period of time based on the obtained transaction information;

predicting, based on the rate of the first item being sold at the website over the period of time, a purchase recommendation for a second item corresponding to the first item, wherein the purchase recommendation comprises a first quantity of the second item and a deadline for purchasing the second item;

creating a shopping list for the user based on the purchase recommendation, wherein the shopping list includes the second item, the first quantity, and the deadline;

accessing one or more merchant, servers to determine one or more merchant locations that offer the second item for sale;

tagging the second item in the shopping list with the geographical locations corresponding to the one or more merchant locations that offer the second item for sale;

identifying members of a collaborative shopping group designated by the user;

determining that a particular member of the collaborative shopping group is available to purchase the second item from at least one of the one or more merchant locations based on location data obtained from geo-location components of user devices associated with the members of the collaborative shopping group and the geographical locations tagged with the second item in the shopping list;

transmitting an alert to a first user device associated with the particular member of the collaborative shopping group, wherein the transmitted alert notifying the particular member to purchase the second item from the at least one of the one or more merchant locations;

receiving a payment request from the particular member for a purchase of the second item from the at least one of the one or more merchant locations; and processing a payment based on the payment request.

15. The non-transitory machine readable medium of claim 14, wherein the operations further comprise determining a date when the second item is expected to be available at a store location.

16. The non-transitory machine readable medium of claim 15, wherein the operations further comprise transmitting alerts to the user devices associated with the members of the collaborative shopping group notifying the members to check for the second item at the store location based on the determined dates.

17. The non-transitory machine readable medium of claim 14, wherein the user comprises an online seller of merchandise.

18. The non-transitory machine readable medium of claim 14, wherein the operations further comprise accessing a second web server associated with a second website that offers the first item for sale to determine a second rate of the first item being sold at the second website, wherein the future demand for the first item is predicted further based on the determined second rate.

* * * * *

UNITED STATES PATENT AND TRADEMARK OFFICE
CERTIFICATE OF CORRECTION

PATENT NO. : 10,319,024 B2
APPLICATION NO. : 14/531461
DATED : June 11, 2019
INVENTOR(S) : Lorena Bueno Lobl Page 1 of 1

It is certified that error appears in the above-identified patent and that said Letters Patent is hereby corrected as shown below:

In the Specification

In the Detailed Description:

In Column 7, Line 35 delete "particular merchants In one" and add "particular merchants. In one"

Signed and Sealed this
Twenty-ninth Day of October, 2019

Andrei Iancu
*Director of the United States Patent and Trademark Office*